United States Patent
Lee (10) Patent No.: US 12,413,301 B2
(45) Date of Patent: Sep. 9, 2025

(54) OPTICAL TRANSCEIVER AND METHOD OF OPTIMIZING OPTICAL TRANSCEIVER

(71) Applicant: ELECTRONICS AND TELECOMMUNICATIONS RESEARCH INSTITUTE, Daejeon (KR)

(72) Inventor: Jyung Chan Lee, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 255 days.

(21) Appl. No.: 18/224,754

(22) Filed: Jul. 21, 2023

(65) Prior Publication Data
US 2024/0214064 A1    Jun. 27, 2024

(30) Foreign Application Priority Data

Dec. 23, 2022  (KR) .......................... 10-2022-0183375

(51) Int. Cl.
| | |
|---|---|
| H04B 10/00 | (2013.01) |
| H04B 10/077 | (2013.01) |
| H04L 1/20 | (2006.01) |
| H04J 14/00 | (2006.01) |

(52) U.S. Cl.
CPC ..... *H04B 10/0775* (2013.01); *H04B 10/0773* (2013.01); *H04L 1/203* (2013.01)

(58) Field of Classification Search
CPC ................................ H04B 10/40; H04B 10/43
See application file for complete search history.

(56) References Cited

U.S. PATENT DOCUMENTS

| | | | |
|---|---|---|---|
| 7,018,114 B2 | 3/2006 | Stewart et al. | |
| 7,529,488 B2 | 5/2009 | Burdick et al. | |
| 9,467,231 B2 | 10/2016 | Bhoja et al. | |
| 10,615,570 B2 | 4/2020 | Gapontsev et al. | |
| 2004/0136422 A1 | 7/2004 | Mahowald et al. | |
| 2009/0028574 A1 | 1/2009 | Dybsetter et al. | |
| 2011/0142453 A1 | 6/2011 | Lee et al. | |
| 2012/0294623 A1 | 11/2012 | Lee et al. | |
| 2016/0322961 A1* | 11/2016 | Daghighian | H03K 3/013 |
| 2017/0054507 A1 | 2/2017 | Elahmadi et al. | |
| 2019/0319703 A1* | 10/2019 | Rope | H04B 10/40 |
| 2020/0127739 A1 | 4/2020 | Ropte et al. | |
| 2020/0310054 A1 | 10/2020 | Epitaux et al. | |

FOREIGN PATENT DOCUMENTS

| | | |
|---|---|---|
| JP | 2009-71345 A | 4/2009 |
| JP | 5944565 B2 | 7/2016 |

* cited by examiner

*Primary Examiner* — Daniel G Dobson
(74) *Attorney, Agent, or Firm* — LRK PATENT LAW FIRM (57) ABSTRACT

Provided are an optical transceiver and a method of optimizing the optical transceiver. The method of optimizing the optical transceiver includes performing power control of communication elements included in a transmitter and a receiver included in the optical transceiver based on a signal flow of the transmitter and the receiver, performing performance initialization of the communication elements based on a control range for each detailed function of the communication elements, and performing performance optimization of the communication elements based on change characteristics of a bit error rate (BER) for each detailed function of the communication elements.

10 Claims, 7 Drawing Sheets

OPTICAL TRANSCEIVER AND METHOD OF OPTIMIZING OPTICAL TRANSCEIVER

CROSS-REFERENCE TO RELATED APPLICATION

This application claims the benefit of Korean Patent Application No. 10-2022-0183375 filed on Dec. 23, 2022, in the Korean Intellectual Property Office, the entire disclosure of which is incorporated herein by reference for all purposes.

BACKGROUND

1. Field of the Invention

One or more embodiments relate to a power control flow, performance initialization, and performance optimization method of an optical transceiver used in an optical communication system.

2. Description of Related Art

Recently, with the spread of long term evolution (LTE) service and the spread of 5G service, the spread of personal mobile phone has been expanding. In addition, the importance of large-capacity data storage and backup devices and the expansion of high-speed transmission networks and fiber to the home for various realistic multimedia services are increasingly emphasized.

In this situation, the utilization of the optical interface function for transmitting and receiving optical signals is increasing, and thus, a method for controlling and optimizing performance characteristics of an optical transceiver functioning as an optical interface in a full-range optical communication network is becoming more important.

SUMMARY

Embodiments provide a power control flow, performance initialization, and performance optimization method of an optical transceiver performing an optical interface function in an optical communication system.

According to an aspect, provided is a method of optimizing an optical transceiver, the method including performing power control of communication elements included in a transmitter and a receiver included in the optical transceiver based on a signal flow of the transmitter and the receiver, performing performance initialization of the communication elements based on a control range for each detailed function of the communication elements, and performing performance optimization of the communication elements based on change characteristics of a bit error rate (BER) for each detailed function of the communication elements.

The performing of the power control of the communication elements may include providing power to the communication elements in a reverse direction of a signal transmitted by the communication elements.

The performing of the performance initialization of the communication elements may include determining a control value of the communication elements as an intermediate value of an overall control range that is controllable for each detailed function of each of the communication elements.

The performing of the performance optimization of the communication elements may include updating a control value of the communication elements in an order (i) when performance degradation is less than a predetermined standard, (ii) when the performance degradation in both directions of a specific point is equal to or greater than a predetermined standard, and (iii) when the performance degradation in one direction of a specific point is equal to or greater than a predetermined standard, in an overall control range that is controllable, based on the BER for each detailed function of the communication elements.

The performing of the performance optimization of the communication elements may include updating the control value of the communication elements using a control value with the smallest BER among control values wherein the performance degradation is within a predetermined standard based on a point where the BER for each detailed function of the communication elements is lowest.

According to another aspect, provided is an optical transceiver including a processor, wherein the processor may be configured to perform power control of communication elements included in a transmitter and a receiver included in the optical transceiver based on a signal flow of the transmitter and the receiver, perform performance initialization of the communication elements based on a control range for each detailed function of the communication elements, and perform performance optimization of the communication elements based on change characteristics of a bit error rate (BER) for each detailed function of the communication elements.

The processor may be configured to perform the power control of the communication elements by providing power to the communication elements in a reverse direction of a signal transmitted by the communication elements.

The processor may be configured to perform the performance initialization of the communication elements by determining a control value of the communication elements as an intermediate value of an overall control range that is controllable for each detailed function of each of the communication elements.

The processor may be configured to perform the performance optimization of the communication elements by updating a control value of the communication elements in an order (i) when performance degradation is less than a predetermined standard, (ii) when the performance degradation in both directions of a specific point is equal to or greater than a predetermined standard, and (iii) when the performance degradation in one direction of a specific point is equal to or greater than a predetermined standard, in an overall control range that is controllable, based on the BER for each detailed function of the communication elements.

The processor may be configured to perform the performance optimization of the communication elements by updating the control value of the communication elements using a control value with the smallest BER among control values wherein performance degradation is within a predetermined standard based on a point where the BER for each detailed function of the communication elements is lowest.

Additional aspects of embodiments will be set forth in part in the description which follows and, in part, will be apparent from the description, or may be learned by practice of the disclosure.

According to embodiments, provided are a power control flow, performance initialization, and performance optimization method of an optical transceiver performing an optical interface function in an optical communication system.

BRIEF DESCRIPTION OF THE DRAWINGS

These and/or other aspects, features, and advantages of the invention will become apparent and more readily appreciated from the following description of embodiments, taken in conjunction with the accompanying drawings of which.

DETAILED DESCRIPTION

The following structural or functional descriptions of embodiments described herein are merely intended for the purpose of describing the embodiments described herein and may be implemented in various forms. However, it should be understood that these embodiments are not construed as limited to the illustrated forms. Various modifications may be made to the embodiments. Here, the embodiments are not construed as limited to the disclosure and should be understood to include all changes, equivalents, and replacements within the idea and the technical scope of the disclosure.

Although terms of "first," "second," and the like are used to explain various components, the components are not limited to such terms. These terms are used only to distinguish one component from another component. For example, a first component may be referred to as a second component, or similarly, the second component may be referred to as the first component within the scope of the present disclosure.

When it is mentioned that one component is "connected" or "accessed" to another component, it may be understood that the one component is directly connected or accessed to another component or that still other component is interposed between the two components. The terminology used herein is for the purpose of describing particular embodiments only and is not to be limiting of the embodiments. As used herein, the singular forms "a," "an," and "the" are intended to include the plural forms as well, unless the context clearly indicates otherwise. As used herein, each of such phrases as "A or B", "at least one of A and B", "at least one of A or B", "A, B or C", "at least one of A, B and C", and "at least one of A, B, or C", may include any one of, or all possible combinations of the items enumerated together in a corresponding one of the phrases. As used herein, the terms "include," "comprise," and "have" specify the presence of stated features, numbers, operations, elements, components, and/or combinations thereof, but do not preclude the presence or addition of one or more other features, numbers, operations, elements, components, and/or combinations thereof.

Unless otherwise defined herein, all terms used herein including technical or scientific terms have the same meanings as those generally understood by one of ordinary skill in the art. Terms defined in dictionaries generally used should be construed to have meanings matching contextual meanings in the related art and are not to be construed as an ideal or excessively formal meaning unless otherwise defined herein.

The term "-unit" used in the present disclosure refers to a software or a hardware component such as a field programmable gate array (FPGA) or an application-specific integrated circuit (ASIC), and "-unit" performs certain roles. However, "-unit" is not limited to a software or a hardware. The term "-unit" may be configured to be in an addressable storage medium and may be configured to reproduce one or more processors. For example, "-unit" may include components such as software components, object-oriented software components, class components, and task components, in addition to processes, functions, properties, procedures, subroutines, segments of program codes, drivers, firmware, microcode, circuitry, data, databases, data structures, tables, arrays, and variables. Functions provided within the components and "-units" may be combined into a smaller number of components and "-units" or further separated into additional components and "-units". Besides, components and "~units" may be implemented to play one or more central processing units (CPUs) in a device or a secure multimedia card. In addition, "-unit" may include one or more processors.

Hereinafter, embodiments will be described in detail with reference to the accompanying drawings. When describing the embodiments with reference to the accompanying drawings, like reference numerals refer to like components and a repeated description related thereto will be omitted.

Figure 1:
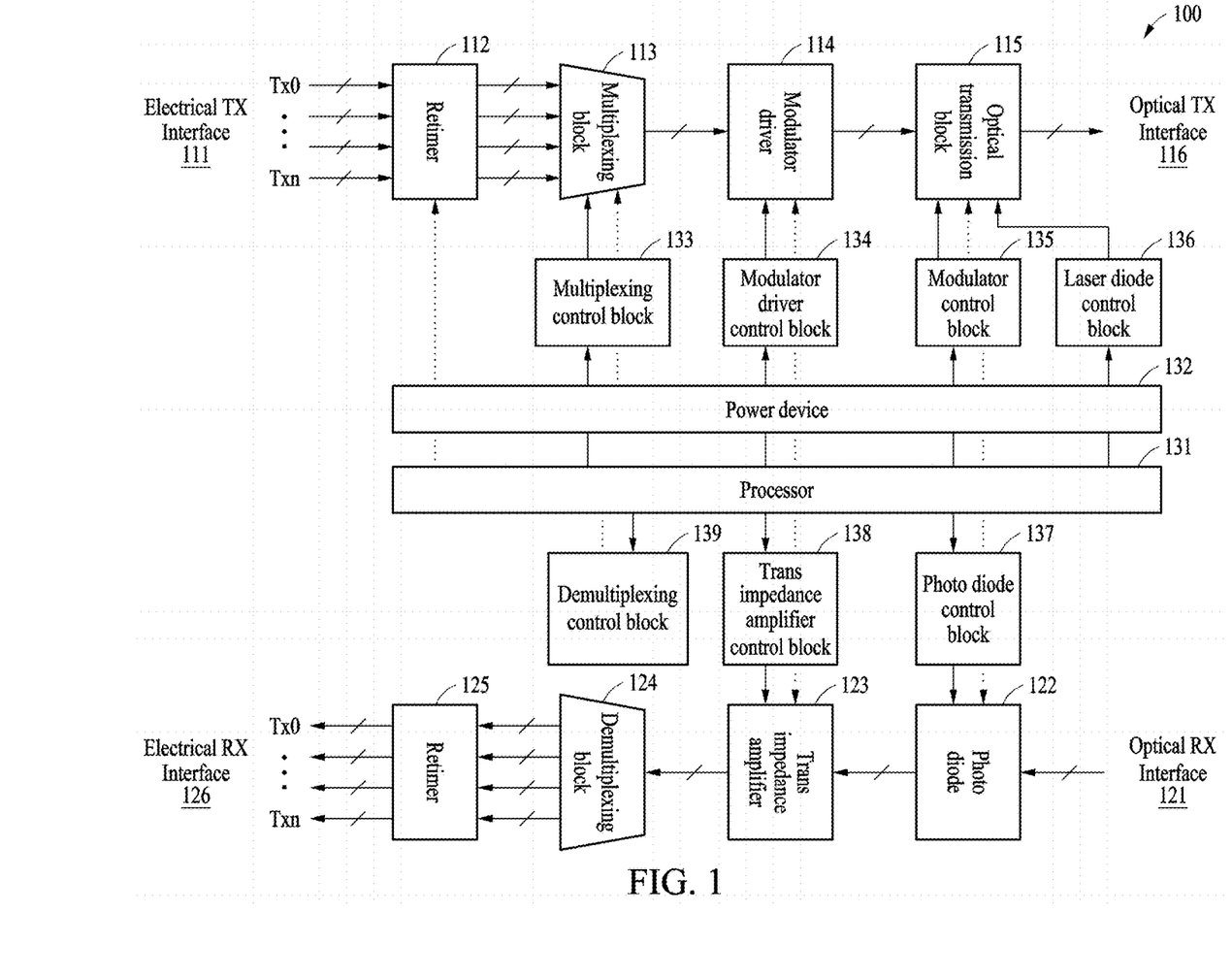
FIG. 1 is a block diagram illustrating the configuration and function of an optical transceiver according to an embodiment.

FIG. 1 is a block diagram illustrating the configuration and function of an optical transceiver according to an embodiment.

Referring to FIG. 1, an optical transceiver 100 of the present disclosure may include a transmitter that converts and outputs an electrical signal into an optical signal through an electrical-to-optical conversion function, a receiver that converts the received optical signal into an electrical signal through an optical-to-electrical conversion function, and a controller that controls communication elements included in the transmitter and the receiver.

The transmitter may include a transmission electrical signal interface (an electrical TX interface) 111, a retimer 112, a multiplexing block 113, a modulator driver 114, an optical transmission block 115, and a transmission optical signal interface (an optical TX interface) 116. Here, the multiplexing block 113 may include a multiplexer (mux), an equalizer (EQ), and a modulation control and the optical transmission block 115 may include an optical modulator and a laser diode (LD). In the present invention, a Mach-Zehnder Modulator (MZM) is provided as an optical modulator, but this is only one embodiment and not limited to the above embodiment.

The receiver may include a receiving optical signal interface (an optical RX interface) 121, a photodiode (PD) 122, a transimpedance amplifier (TIA) 123, a demultiplexing block 124, a retimer 125, and a receiving electrical signal interface (an electrical RX interface) 126. Here, the demultiplexing block 124 may include a demultiplexer (demux) and an EQ.

A processor 131 of the controller may perform power control of the communication elements included in the transmitter and the receiver through a power device 132. Also, the processor 131 may perform function control of the communication elements included in the transmitter and the receiver through a plurality of control blocks.

More specifically, in the case of the transmitter, the processor 131 may control the function of the mux that multiplexes a plurality of signals through a multiplexing control block 133, may control the function of the EQ that adjusts eye diagram characteristics of the multiplexed signal, and may control the function of the modulation control that adjusts the inner eye and outer eye ratios of an eye diagram input to the modulator driver block 114.

Also, the processor 131 may control the function of the modulator driver 114 through a modulator driver control block 134.

Subsequently, the processor 131 may adjust a DC bias for modulation input to the optical modulator of the optical transmission block 115 through a modulator control block 135 and may adjust the amount of phase change of a thermo-optic phase shifter (TOPS) included in the optical modulator.

Also, the processor 131 may adjust a current bias input to the LD of the optical transmission block 115 through an LD control block 136.

In the case of the receiver, the processor 131 may adjust a bias (a voltage for a PD, VPD) of the PD 122 through a PD control block 137.

Also, the processor 131 may adjust high-band amplification and full-band amplification for the eye diagram of the optical-electrically converted signal through a TIA control block 138. Here, the full-band amplification for the eye diagram may be automatically controlled through the TIA control block 138.

Subsequently, the processor 131 may control the function of the demux that demultiplexes the received signal into a plurality of signals through a demultiplexing control block 139 and may control the function of the EQ that adjusts the eye diagram characteristics of the demultiplexed signal.

Figure 2:
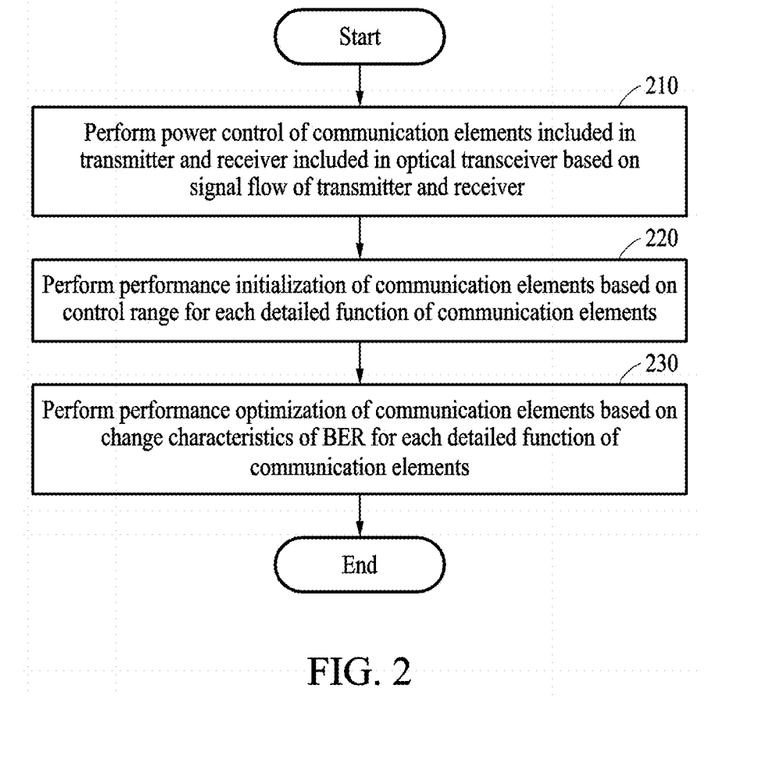
FIG. 2 is a flowchart illustrating a method of optimizing an optical transceiver, according to an embodiment.

FIG. 2 is a flowchart illustrating a method of optimizing an optical transceiver, according to an embodiment.

Figure 3A:
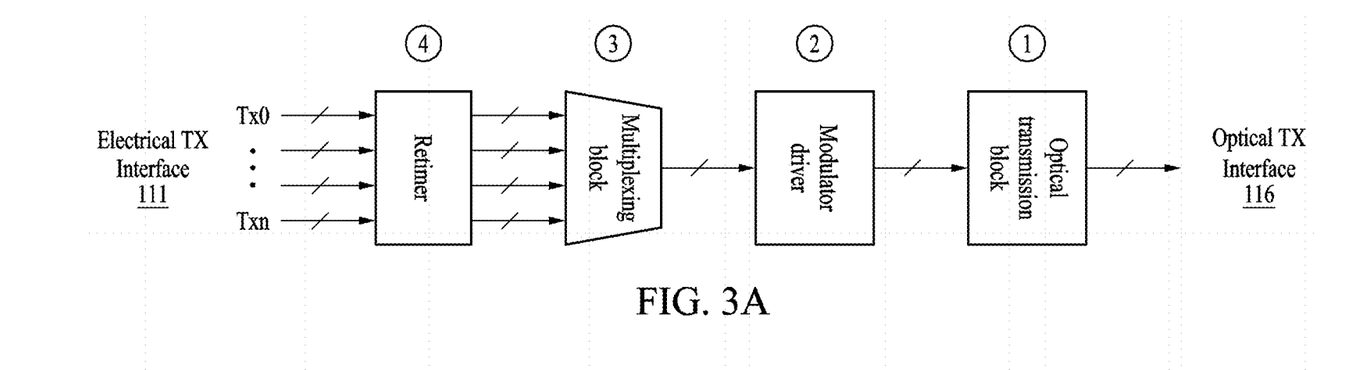
FIGS. 3A and 3B are diagrams illustrating operations for providing power to a transmitter and a receiver according to an embodiment.

In operation 210, the processor 131 may perform power control of the communication elements included in the transmitter and the receiver based on a signal flow of the transmitter and the receiver included in the optical transceiver 100. The processor 131 may perform power control to protect each of the communication elements of the transmitter and the receiver, that is, the high-speed signal processing component elements, from mutual instantaneous reflection effects caused by rapid instantaneous power supply. To this end, the processor 131 may provide power to the corresponding communication elements in the reverse direction of a signal transmitted by the communication elements. FIGS. 3A and 3B are diagrams illustrating operations for providing power to the transmitter and the receiver according to an embodiment. Referring to FIG. 3A, the processor 131 may control the power device 132 to provide power to the communication elements included in the transmitter in the reverse direction of the signal flow from the electrical TX interface 111 to the optical TX interface 116.

Figure 3B:
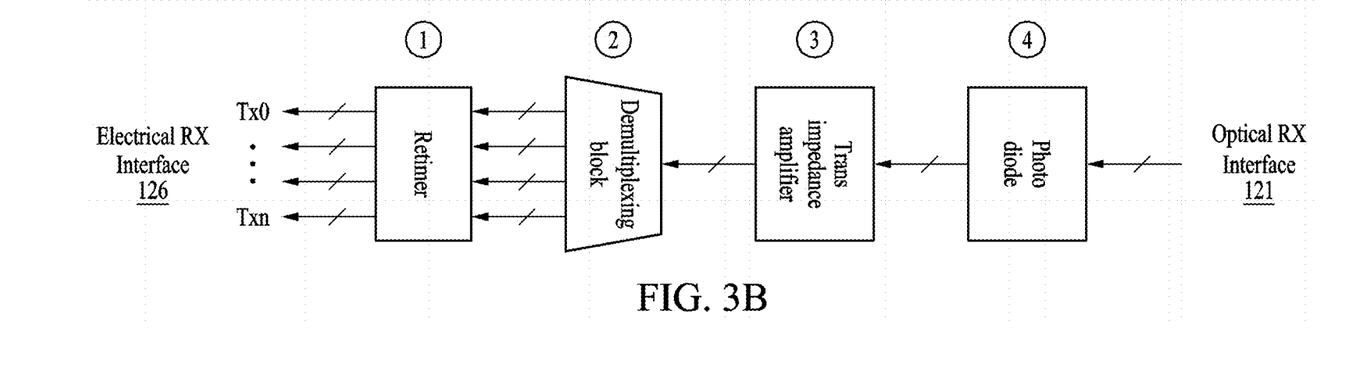

In addition, referring to FIG. 3B, the processor 131 may control the power device 132 to provide power to the communication elements included in the receiver in the reverse direction of the signal flow from the optical RX interface 121 to the electrical RX interface In operation 220, the processor 131 may perform performance initialization of the communication elements based on a control range for each detailed function of the communication elements.

Figure 4A:
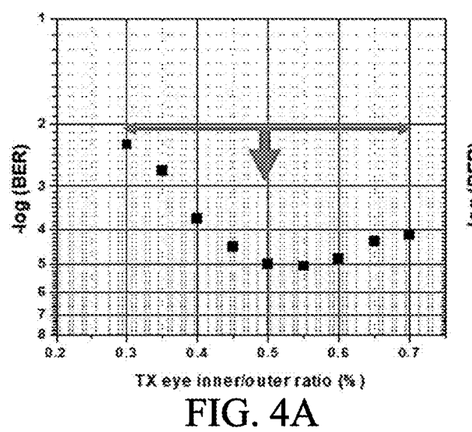
FIGS. 4A to 4D are diagrams illustrating performance change characteristics for each detailed function of communication elements included in a transmitter of an optical transceiver according to an embodiment.
Figure 4B:
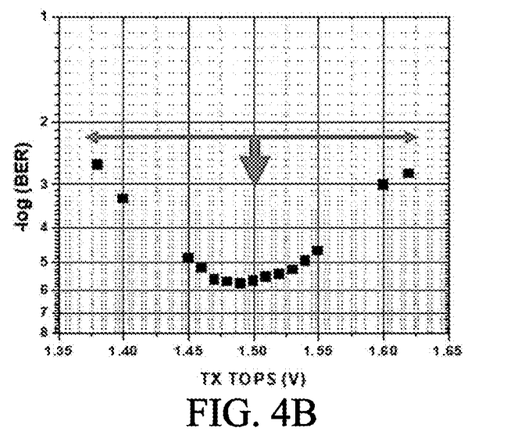

FIGS. 4A to 4D are diagrams illustrating performance change characteristics for each detailed function of communication elements included in the transmitter of the optical transceiver 100 according to the present disclosure. More specifically, FIG. 4A shows a bit error rate (BER) change of the optical transceiver 100 according to the inner eye and outer eye ratio of the eye diagram input to the modulator driver 114, and FIG. 4B shows the BER change of the optical transceiver 100 according to the amount of phase change of the TOPS included in the optical modulator.

Figure 4C:
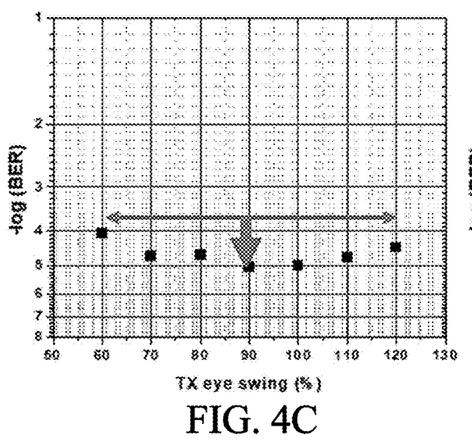
Figure 4D:
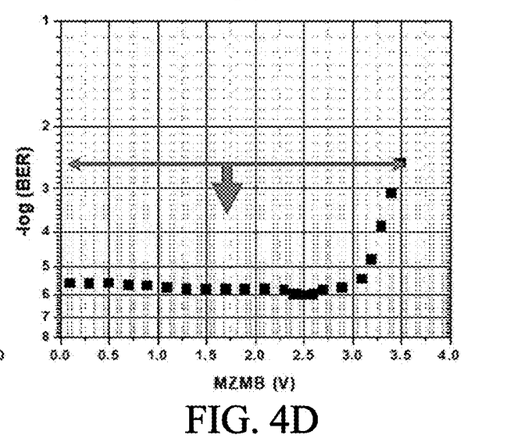

FIG. 4C shows the BER change of the optical transceiver 100 according to the change rate of a transmission signal eye swing (TX eye swing), and FIG. 4D shows the BER change of the optical transceiver 100 according to the change amount of the DC bias for modulation input to the optical modulator.

Figure 5A:
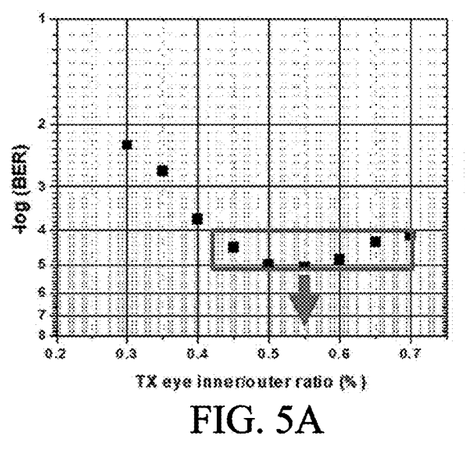
FIGS. 5A to 5C are diagrams illustrating performance change characteristics for each detailed function of communication elements included in a receiver of an optical transceiver according to an embodiment.
Figure 5B:
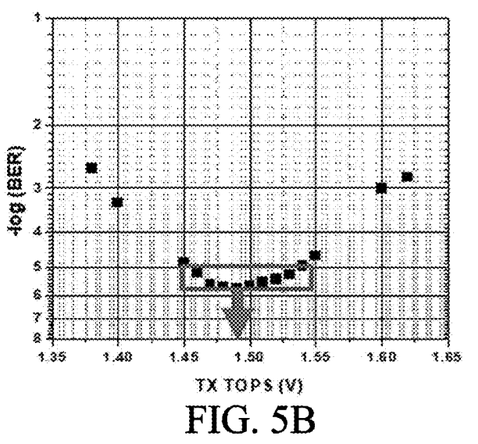
Figure 5C:
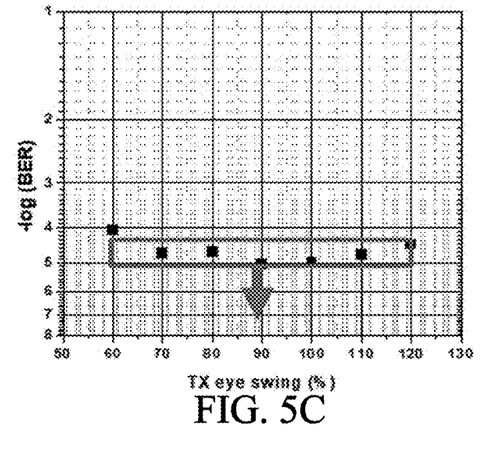

FIGS. 5A to 5C are diagrams illustrating performance change characteristics for each detailed function of communication elements included in the receiver of the optical transceiver 100 according to the present disclosure. More specifically, FIG. 5A shows the BER change of the optical transceiver 100 according to the change amount of the bias (VPD) input to the PD 122, FIG. 5B shows the BER change of the optical transceiver 100 according to the change amount of high-band amplification (ZPK) for the eye diagram of a received signal, and FIG. 5C shows the BER change of the optical transceiver 100 according to the change amount of full-band amplification (OA) for the eye diagram of the received signal.

Referring to FIGS. 4A to 5C, the processor 131 of the present disclosure may perform performance initialization by determining a control value of the corresponding communication elements as an intermediate value (the position of the arrow) of an overall control range that is controllable for each detailed function of each of the communication elements.

In operation 230, the processor 131 may perform performance optimization of the communication elements based on change characteristics of the BER for each detailed function of the communication elements.

Figure 6A:
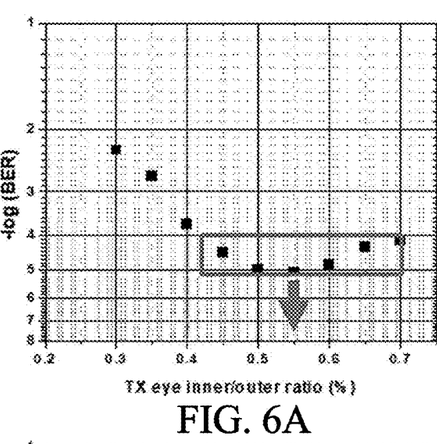
FIGS. 6A to 6D are diagrams illustrating a performance optimization method for each detailed function of communication elements included in a transmitter of an optical transceiver according to an embodiment.
Figure 6B:
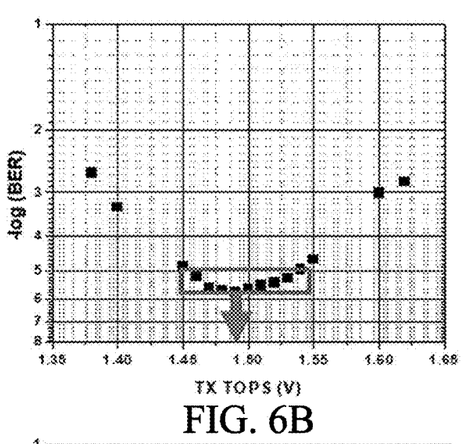
Figure 6C:
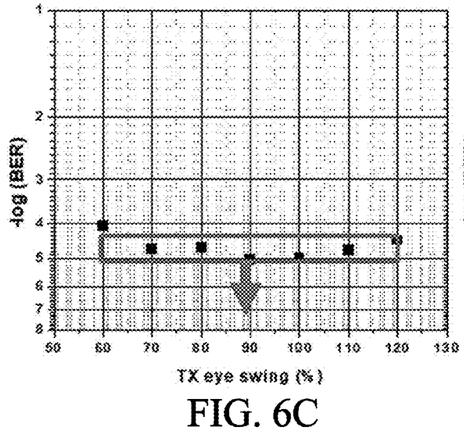
Figure 6D:
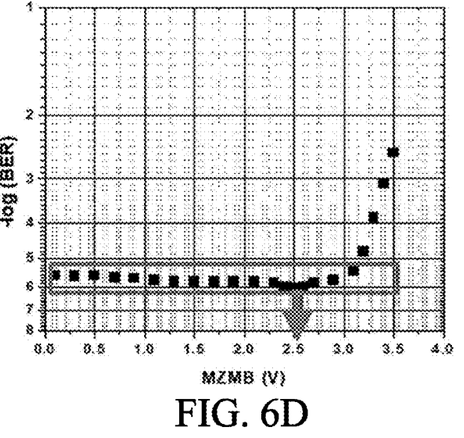
Figure 7A:
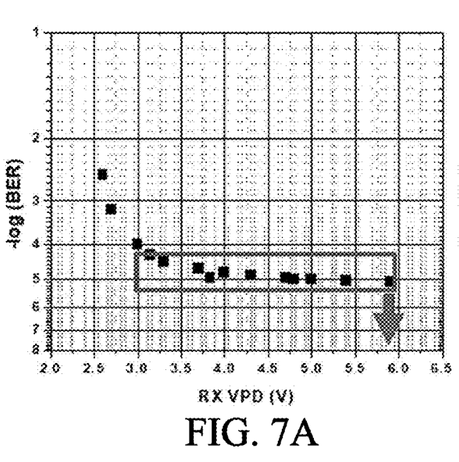
FIGS. 7A to 7C are diagrams illustrating a performance optimization method for each detailed function of communication elements included in a receiver of an optical transceiver according to an embodiment.
Figure 7B:
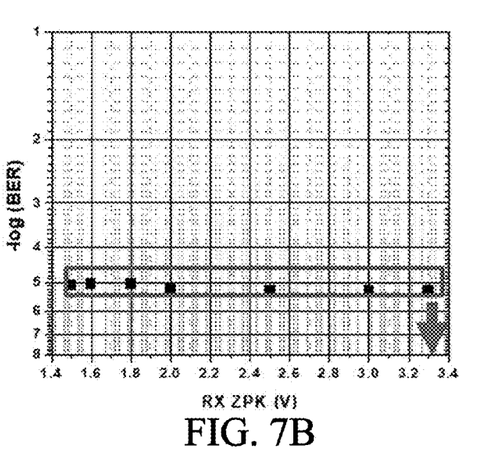
Figure 7C:
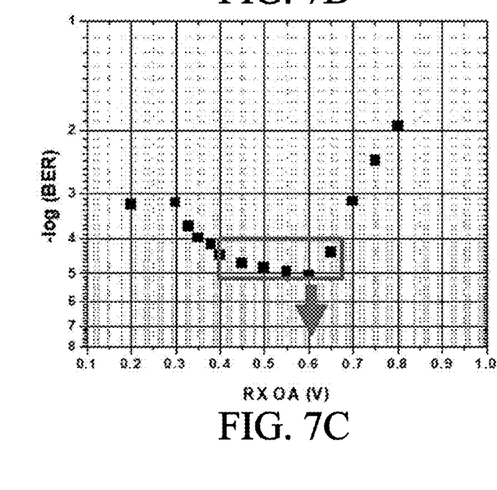

FIGS. 6A to 6D are diagrams illustrating a performance optimization method for each detailed function of communication elements included in the transmitter of the optical transceiver 100 according to an embodiment and FIGS. 7A to 7C are diagrams illustrating a performance optimization method for each detailed function of communication elements included in the receiver of the optical transceiver 100.

Here, the processor 131 may perform performance optimization by distinguishing between cases when performance degradation is less than a predetermined standard as shown in FIG. 6C and FIG. 7B, when the performance degradation in both directions of a specific point is equal to or greater than a predetermined standard as shown in FIGS. 6A and 6B and FIG. 7C, and when the performance degradation in one direction of a specific point is equal to or greater than a predetermined standard as shown in FIG. 6D and FIG. 7A, in an overall control range that is controllable, based on the BER for each detailed function of the communication elements.

More specifically, the processor 131 may perform performance optimization of the communication elements by updating the control value of the communication elements in the order (i) when the performance degradation is less than a predetermined standard, (ii) when the performance degradation in both directions of a specific point is equal to or greater than a predetermined standard, and (iii) when the performance degradation in one direction of a specific point is equal to or greater than a predetermined standard.

Here, the standard for determining the performance degradation required to perform the performance optimization of the communication elements is the BER and for example, BER 2.4E-4 defined as KP4 FEC limit or BER 3.8E-3 defined as HD-FEC limit may be the standard.

Here, the processor 131 may perform performance optimization by controlling the communication elements using a control value (the arrow) with the smallest BER among control values (within the square box) wherein the performance degradation is within the range of about the first power of the BER based on a point where the BER for each detailed function of the communication elements is lowest.

The components described in the embodiments may be implemented by hardware components including, for example, at least one digital signal processor (DSP), a processor, a controller, an ASIC, a programmable logic element, such as an FPGA, other electronic devices, or combinations thereof. At least some of the functions or the processes described in the embodiments may be implemented by software, and the software may be recorded on a recording medium. The components, the functions, and the processes described in the embodiments may be implemented by a combination of hardware and software.

The embodiments described herein may be implemented using hardware components, software components and/or combinations thereof. A processing device may be implemented using one or more general-purpose or special purpose computers, such as, for example, a processor, a controller and an arithmetic logic unit (ALU), a DSP, a microcomputer, an FPGA, a programmable logic unit (PLU), a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciate that a processing device may include multiple processing elements and multiple types of processing elements. For example, a processing device may include multiple processors or a processor and a controller. In addition, different processing configurations are possible, such as parallel processors.

The software may include a computer program, a piece of code, an instruction, or some combination thereof, to independently or collectively instruct or configure the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more non-transitory computer readable recording mediums.

The method according to the above-described embodiments may be recorded in non-transitory computer-readable media including program instructions to implement various operations which may be performed by a computer. The media may also include, alone or in combination with the program instructions, data files, data structures, and the like. The program instructions recorded on the media may be those specially designed and constructed for the purposes of the embodiments, or they may be of the well-known kind and available to those having skill in the computer software arts. Embodiments of non-transitory computer-readable media include magnetic media such as hard disks, floppy disks, and magnetic tape; optical media such as CD ROM discs and DVDs; magneto-optical media such as optical discs; and hardware devices that are specially configured to store and perform program instructions, such as read-only memory (ROM), random access memory (RAM), flash memory, and the like. The media may be transfer media such as optical lines, metal lines, or waveguides including a carrier wave for transmitting a signal designating the program command and the data construction. Embodiments of program instructions include both machine code, such as code produced by a compiler, and files containing higher level code that may be executed by the computer using an interpreter.

The described hardware devices may be configured to act as one or more software modules in order to perform the operations of the above-described embodiments, or vice versa.

While this disclosure includes embodiments, it will be apparent to one of ordinary skill in the art that various changes in form and details may be made in these embodiments without departing from the spirit and scope of the claims and their equivalents. The embodiments described herein are to be considered in a descriptive sense only, and not for purposes of limitation. Descriptions of features or aspects in each embodiment are to be considered as being applicable to similar features or aspects in other embodiments. Suitable results may be achieved if the described techniques are performed in a different order, and/or if components in a described system, architecture, device, or circuit are combined in a different manner and/or replaced or supplemented by other components or their equivalents.

Therefore, the scope of the disclosure is defined not by the detailed description, but by the claims and their equivalents, and all variations within the scope of the claims and their equivalents are to be construed as being included in the disclosure.

What is claimed is:

1. A method of optimizing an optical transceiver, the method comprising:
    performing power control of communication elements included in a transmitter and a receiver included in the optical transceiver based on a signal flow of the transmitter and the receiver;
    performing performance initialization of the communication elements based on a control range for each detailed function of the communication elements; and
    performing performance optimization of the communication elements based on change characteristics of a bit error rate (BER) for each detailed function of the communication elements.

2. The method of claim 1, wherein
    the performing of the power control of the communication elements comprises providing power to the communication elements in a reverse direction of a signal transmitted by the communication elements.

3. The method of claim 1, wherein
    the performing of the performance initialization of the communication elements comprises determining a control value of the communication elements as an intermediate value of an overall control range that is controllable for each detailed function of each of the communication elements.

4. The method of claim 1, wherein
the performing of the performance optimization of the communication elements comprises updating a control value of the communication elements in an order (i) when performance degradation is less than a predetermined standard, (ii) when the performance degradation in both directions of a specific point is equal to or greater than a predetermined standard, and (iii) when the performance degradation in one direction of a specific point is equal to or greater than a predetermined standard, in an overall control range that is controllable, based on the BER for each detailed function of the communication elements.

5. The method of claim 4, wherein
the performing of the performance optimization of the communication elements comprises updating the control value of the communication elements using a control value with the smallest BER among control values wherein the performance degradation is within a predetermined standard based on a point where the BER for each detailed function of the communication elements is lowest.

6. An optical transceiver comprising:
a processor,
wherein the processor is configured to:
perform power control of communication elements included in a transmitter and a receiver included in the optical transceiver based on a signal flow of the transmitter and the receiver;
perform performance initialization of the communication elements based on a control range for each detailed function of the communication elements; and
perform performance optimization of the communication elements based on change characteristics of a bit error rate (BER) for each detailed function of the communication elements.

7. The optical transceiver of claim 6, wherein
the processor is configured to perform the power control of the communication elements by providing power to the communication elements in a reverse direction of a signal transmitted by the communication elements.

8. The optical transceiver of claim 6, wherein
the processor is configured to perform the performance initialization of the communication elements by determining a control value of the communication elements as an intermediate value of an overall control range that is controllable for each detailed function of each of the communication elements.

9. The optical transceiver of claim 6, wherein
the processor is configured to perform the performance optimization of the communication elements, by updating a control value of the communication elements in an order (i) when performance degradation is less than a predetermined standard, (ii) when the performance degradation in both directions of a specific point is equal to or greater than a predetermined standard, and (iii) when the performance degradation in one direction of a specific point is equal to or greater than a predetermined standard, in an overall control range that is controllable, based on the BER for each detailed function of the communication elements.

10. The optical transceiver of claim 9, wherein
the processor is configured to perform the performance optimization of the communication elements by updating the control value of the communication elements using a control value with the smallest BER among control values wherein performance degradation is within a predetermined standard based on a point where the BER for each detailed function of the communication elements is lowest.

* * * * *